(12) United States Patent
Chen et al.

(10) Patent No.: US 7,738,932 B2
(45) Date of Patent: Jun. 15, 2010

(54) MOBILE ELECTRONIC DEVICE WITH A CAMERA RING SERVING AS AN ANTENNA

(75) Inventors: Yun-Ta Chen, Taipei County (TW); Wan-Hsieh Liu, Taipei County (TW); Ching-Cheng Hsu, Taipei County (TW)

(73) Assignee: HTC Corporation, Taoyuan (TW)

( * ) Notice: Subject to any disclaimer, the term of this patent is extended or adjusted under 35 U.S.C. 154(b) by 909 days.

(21) Appl. No.: 11/431,547

(22) Filed: May 11, 2006

(65) Prior Publication Data
US 2006/0256186 A1 Nov. 16, 2006

(30) Foreign Application Priority Data
May 12, 2005 (TW) .............................. 94115372 A

(51) Int. Cl.
*H04W 40/06* (2009.01)
(52) U.S. Cl. ............... 455/575.7; 455/550.1; 455/575.1
(58) Field of Classification Search ........................ None
See application file for complete search history.

(56) References Cited

U.S. PATENT DOCUMENTS

| 6,011,519 A | 1/2000 | Sadler et al. |
| 6,317,092 B1 * | 11/2001 | de Schweinitz et al. ...... 343/753 |
| 6,975,273 B1 * | 12/2005 | Choi ........................... 343/702 |
| 7,068,227 B2 * | 6/2006 | Ying ........................... 343/702 |
| 7,362,371 B1 * | 4/2008 | Tanaka et al. ............... 348/373 |
| 2001/0035905 A1 * | 11/2001 | Auffret ........................ 348/159 |
| 2004/0217907 A1 * | 11/2004 | Inoue .......................... 343/728 |
| 2004/0227670 A1 * | 11/2004 | Higasa ................. 343/700 MS |
| 2006/0019696 A1 * | 1/2006 | Brunel et al. ............. 455/550.1 |
| 2006/0121949 A1 * | 6/2006 | Awada et al. ............... 455/567 |

FOREIGN PATENT DOCUMENTS

| CN | 1333934 A | 1/2002 |
| EP | 1 359 675 A1 | 11/2003 |
| WO | WO-02/27862 A1 | 4/2002 |
| WO | WO-03/030297 A1 | 4/2003 |

* cited by examiner

*Primary Examiner*—Rafael Pérez-Gutiérrez
*Assistant Examiner*—Frank Donado
(74) *Attorney, Agent, or Firm*—Birch, Stewart, Kolasch & Birch, LLP

(57) ABSTRACT

The invention relates to a mobile electronic device, and in particular, to a mobile electronic device with a camera ring serving as an antenna. A mobile electronic device comprises an RF module, a camera lens, and a camera ring. The RF module disposed inside of the mobile electronic device is utilized to process an RF signal. The camera ring disposed on a peripheral of the camera lens and connected with the RF module is utilized to transmit or receive the RF signal to the RF module.

8 Claims, 3 Drawing Sheets

MOBILE ELECTRONIC DEVICE WITH A CAMERA RING SERVING AS AN ANTENNA

BACKGROUND OF THE INVENTION

1. Field of the Invention

The invention relates to a mobile electronic device, and in particular, to a mobile electronic device with a camera ring serving as an antenna.

2. Description of the Related Art

With the development of the IT industry and the digital home, mobile electronic devices are more and more popular. Personal digital assistants (PDAs) for example, have more and more functionality (e.g. internet, GPS . . . ). From the above description, an antenna utilized to transmit or receive an RF signal has become a key component for mobile electronic devices.

A prior art of the mobile electronic device utilizes a chip antenna, which is disposed on a Printed circuit board (PCB), to transmit or receive RF signals and utilizes an RF module to process the RF signal. However, the antenna efficiency and the bandwidth of the chip antenna are poor due to the limitations of the higher dielectric constant medium and the buried antenna pattern. Additionally, complicated processing (e.g. Low-Temperature co-fired ceramics, LTCC) incurs a higher cost.

BRIEF SUMMARY OF INVENTION

A detailed description is given in the following embodiments with reference to the accompanying drawings. The mobile electronic device comprises an RF module, a camera lens, and a camera ring. The RF module disposed inside the mobile electronic device is utilized to process an RF signal. The camera ring disposed on a peripheral of the camera lens and connected with the RF module is utilized to transmit or receive the RF signal to the RF module.

BRIEF DESCRIPTION OF DRAWINGS

The present invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
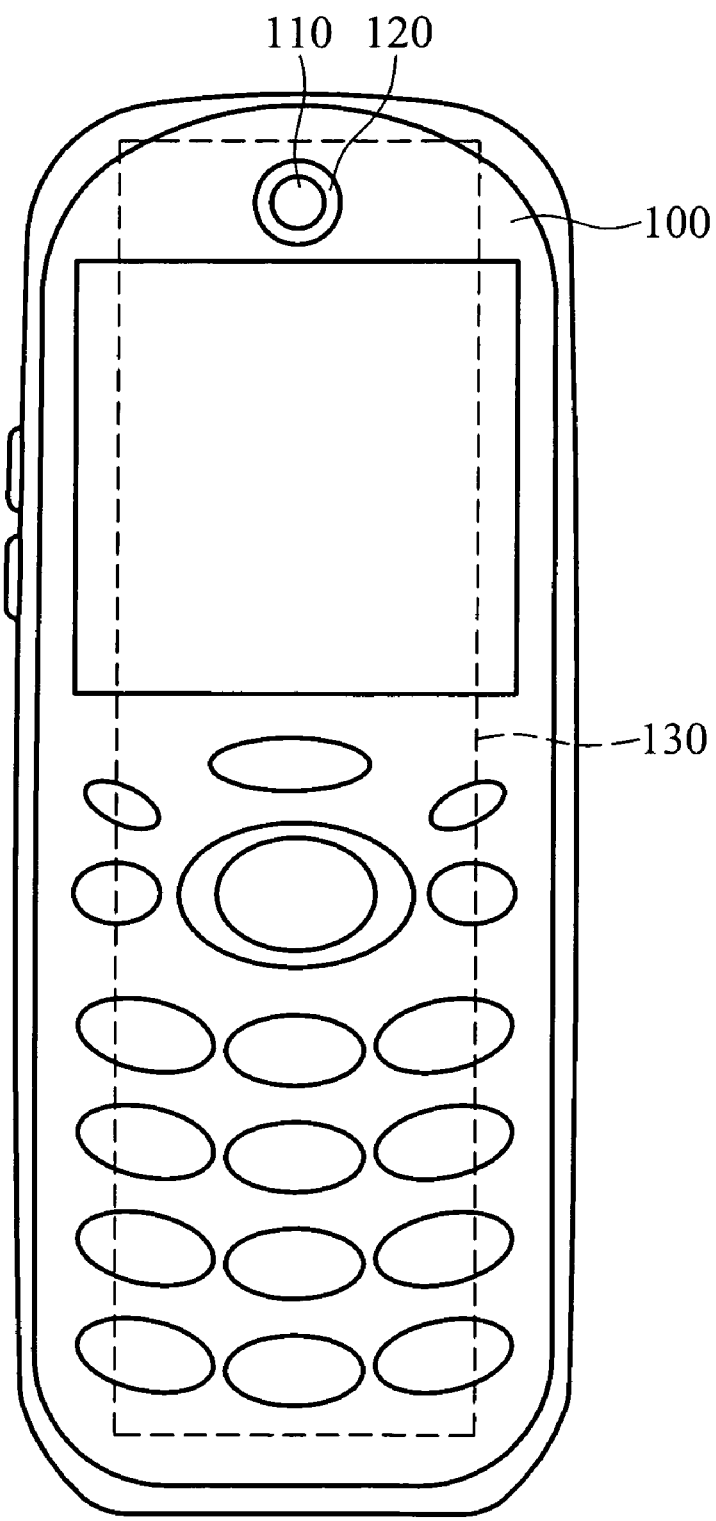
FIG. 1 is a front view diagram of a mobile electronic device according to an embodiment of the invention.

A detailed description of the present invention is provided as follows. Please refer to FIG. 1. FIG. 1 shows a front view diagram of a mobile electronic device 100 according to an embodiment of the invention. The mobile electronic device 100 comprises a camera lens 110, a camera ring 120, and an RF module 130. As shown in FIG. 1, the camera lens 110 and the camera ring 120 is disposed on a housing of the mobile electronic device 100. The RF module 130 is disposed on inside of the mobile electronic device 100. The camera lens 110 is utilized in taking photographs. The camera ring 120 besides providing decoration for the camera lens 110 is utilized to connect to the RF module 130 to transmit an RF signal or receive an RF signal from the RF module 130. The RF module 130 is utilized to process the RF signal from the camera ring 120. A detailed description of the camera ring 120 is provided as follows.

The camera ring 120 is made of metal materials having a ring type antenna radiator like a donut shape, the inner diameter of which is determined according to the size of the camera lens 110 and the outer diameter is determined according to an operational frequency of the ring type antenna radiator. For example, if the operational frequency is 2.4 GHz (e.g. WLAN or Bluetooth), the outer diameter can be calculated to be about 12 mm~14 mm. If the operational frequency is 1.575 GHz (e.g. Global Positioning System, GPS), the outer diameter can be calculated to be about 17 mm. Please note that the outer diameter is only for coarse tuning of the operational frequency, while the fine tuning of the operational frequency is processed in a matching circuit (not shown) of the RF module 130. The inner diameter can be determined to be equal to the diameter of the camera lens 110 (e.g. 6 mm). A detailed description of the connection between the camera ring 120 and the RF module 130 is provided as follows.

Figure 2:
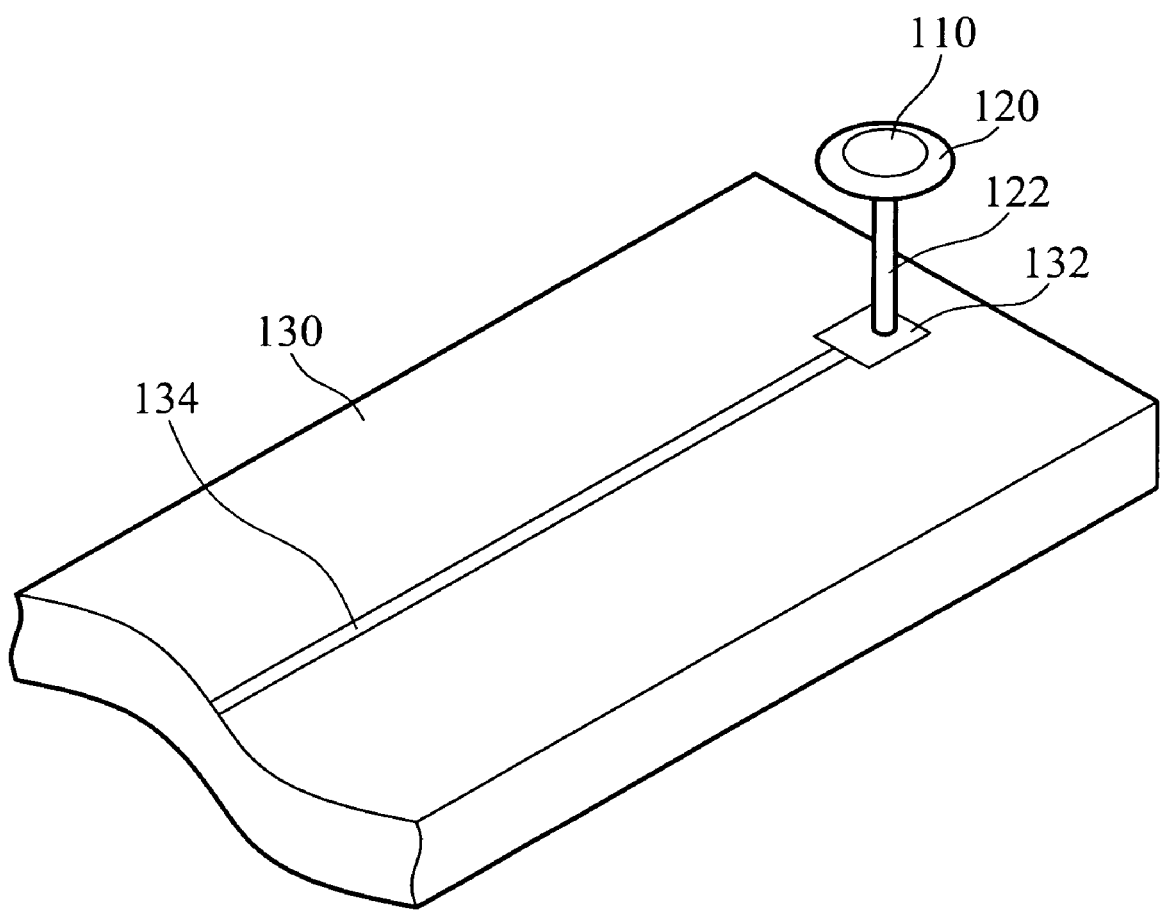
FIG. 2 is a perspective view diagram of a mobile electronic device according to an embodiment of the invention.

Please refer to FIG. 2. FIG. 2 shows a perspective view diagram of a mobile electronic device 100 according to an embodiment of the invention. The RF module 130 comprises a feeding point 132 and a transmission line (e.g. microstrip) 134. The camera ring 120 comprises a feeding pin 122. The connection between the camera ring 120 and the RF module 130 utilizes the feeding pin 122 to connect the feeding point 132 to transmit or receive the RF signal to the transmission line 134. Please note that the height of the feeding pin is a predetermined value (e.g. 7.5 mm) to maintain a fixed distance between the camera ring 120 and the RF module 130, in order to obtain a better antenna gain and radiation pattern. The radiation pattern is critical for receiving or transmitting signals. Additionally, a distance between the center of the camera ring 120 and the RF module 130 is also a predetermined value (e.g. 15 mm in x-direction, 25 mm in y-direction) to obtain a better performance. A detailed description of fabrication is provided as follows.

Figure 3:
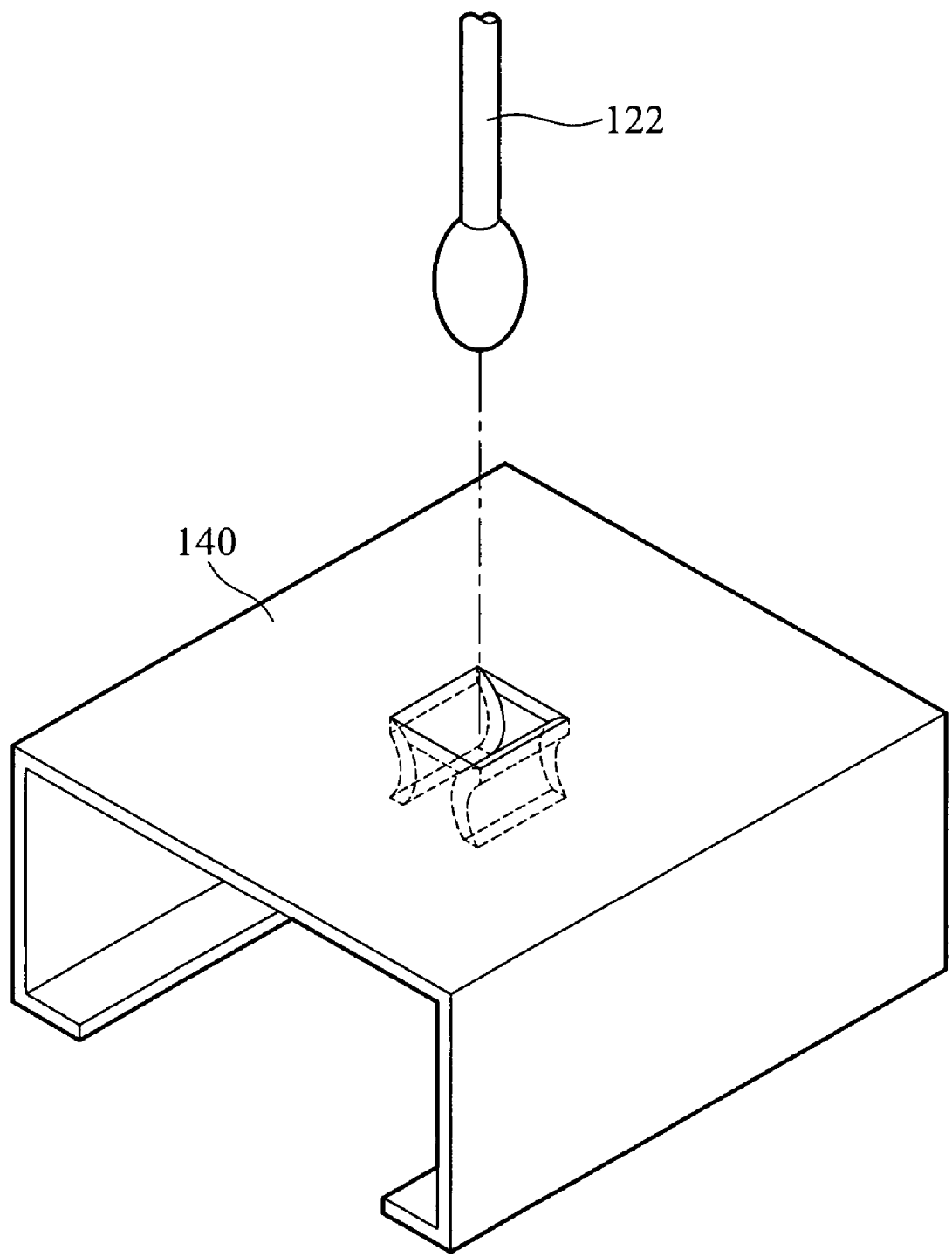
FIG. 3 is a schematic diagram of the fabrication of the camera ring.

Please refer to FIG. 3. FIG. 3 shows a schematic diagram of fabrication of the camera ring 120. As shown in FIG. 3, a connecter 140 connected to the RF module 130 by Surface Mount Device (SMD) technology is utilized to assist the feeding pin 122 in fixing on the feeding point 132. In other words, the feeding pin. 122 can be connected to the feeding point 132 by easily inserting the feeding pin into the hole of the connecter 140 rather than welding. Additional antenna holders are also not necessary. This kind of fabrication not only simplifies fabrication but also reduces cost. Hence, the above-mentioned simple method of fixing the camera ring can increase the reliability and simplify the processing procedure.

Compared with the related chip antenna, the mobile electronic device has a better antenna efficiency and bandwidth since the dielectric constant medium is air. Additionally, the processing of the camera ring serving as an antenna is simple, and the cost is reduced. The novel design of combining the antenna functionality with the camera ring is not only decorative but also reduces occupied space on the PCB.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile electronic device comprising:
an RF module disposed inside the mobile electronic device for processing an RF signal;
a camera lens; and
a camera ring disposed on a peripheral of the camera lens and connected with the RF module for transmitting or receiving the RF signal to the RF module, wherein the camera ring is a closed ring antenna radiator without a gap,
wherein the camera ring comprises a feeding pin for connecting the camera ring and the RF module, and
wherein the height of the feeding pin is a predetermined value to maintain a fixed distance between the camera ring and the RF module.

2. The mobile electronic device according to-claim 1, wherein an outer diameter of the closed ring antenna radiator is tunable in order to have different operational frequencies of the ring type antenna radiator.

3. The mobile electronic device according to claim 2, wherein the outer diameter corresponds to an operational frequency of WLAN or Bluetooth.

4. The mobile electronic device according to claim 2, wherein the outer diameter corresponds to an operational frequency of Global Positioning System.

5. The mobile electronic device according to claim 1, further comprising: a connecter for fixing the feeding pin to at least one feeding point of the RF module.

6. The mobile electronic device according to claim 1, wherein the mobile electronic device comprises a personal digital assistant.

7. The mobile electronic device according to claim 1, wherein the mobile electronic device is a cellular phone.

8. The mobile electronic device according to claim 1, wherein the distance between the center of the camera ring and the RF module has a predetermined value.

* * * * *